(12) United States Patent
Wang et al.

(10) Patent No.: US 11,698,863 B1
(45) Date of Patent: Jul. 11, 2023

(54) DATA SET AND NODE CACHE-BASED SCHEDULING METHOD AND DEVICE

(71) Applicant: INSPUR SUZHOU INTELLIGENT TECHNOLOGY CO., LTD., Jiangsu (CN)

(72) Inventors: Dekui Wang, Jiangsu (CN); Pei Chen, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/024,732

(22) PCT Filed: Jul. 30, 2021

(86) PCT No.: PCT/CN2021/109626
§ 371 (c)(1),
(2) Date: Mar. 3, 2023

(87) PCT Pub. No.: WO2022/048365
PCT Pub. Date: Mar. 10, 2022

(30) Foreign Application Priority Data

Sep. 4, 2020 (CN) .......................... 202010923074.8

(51) Int. Cl.
*G06F 12/08* (2016.01)
*G06F 12/0842* (2016.01)
*G06F 12/0891* (2016.01)

(52) U.S. Cl.
CPC ...... *G06F 12/0842* (2013.01); *G06F 12/0891* (2013.01)

(58) Field of Classification Search
CPC .......................... G06F 12/0842; G06F 12/0891
See application file for complete search history.

(56) References Cited

U.S. PATENT DOCUMENTS

| 2019/0132392 A1* | 5/2019 | Liu .......................... H04L 67/02 |
| 2020/0092392 A1* | 3/2020 | Seelam .................... G06N 3/08 |

FOREIGN PATENT DOCUMENTS

| CN | 110502487 A | 11/2019 |
| CN | 110795217 A | 2/2020 |
| CN | 111158852 A | 5/2020 |

(Continued)

OTHER PUBLICATIONS

PCT/CN2021/109626 international search report.

*Primary Examiner* — Masud K Khan
(74) *Attorney, Agent, or Firm* — IPro, PLLC (57) ABSTRACT

Disclosed is a data set and node cache-based scheduling method, which includes: obtaining storage resource information of each host node; in response to receiving a training task, obtaining operation information of the training task, and according to the operation information and the storage resource information, screening host nodes that satisfy a space required by the training task; in response to no host node satisfying the space required by the training task, scoring each host node according to the storage resource information; according to scoring results, selecting, from among all of the host nodes, a host node to be executed that is used to execute the training task; and obtaining and deleting an obsolete data set cache in the host node to be executed, and executing the training task in the host node to be executed.

20 Claims, 3 Drawing Sheets

(56) References Cited

FOREIGN PATENT DOCUMENTS

| CN | 111444019 A | 7/2020 |
| CN | 112202837 A | 1/2021 |
| WO | 2020010251 A1 | 1/2020 |

* cited by examiner

DATA SET AND NODE CACHE-BASED SCHEDULING METHOD AND DEVICE

The present disclosure claims the priority of the Chinese patent application filed on Sep. 4, 2020 before the CNIPA, China National Intellectual Property Administration with the application number of 202010923074.8 and the title of "DATA SET AND NODE CACHE-BASED SCHEDULING METHOD AND DEVICE", which is incorporated herein in its entirety by reference.

FIELD

The present disclosure relates to the technical field of computer, in particular to a data set and node cache-based scheduling method and device.

BACKGROUND

In an artificial intelligence (AI) scenario, training tasks have a strong dependence on data sets. For example, the quality of the data sets will affect the accuracy of a model, and the speed of loading data sets by training scripts will affect the training speed of the model. The data sets used for AI training are usually an open-source data set, such as image network (ImageNet) data set, handwritten digit recognition (MNIST) data set, etc. or an industry-related data set, such as medical treatment, transportation, etc.; for an AI resource management platform, it is usually impossible to evaluate the quality of the data set but are required to be ensured by algorithm personnel. Generally, when initiating a training task, the algorithm personnel usually need to manually download these data to a node to start the training task; however, with regard to the AI resource management platform, a manual download data set is usually optimized as an automatic download data set; and when starting a training task, the AI resource management platform will automatically download the required data set for the training task. As the AI resource management platform, a variety of data sets will be provided for the algorithm personnel, and these data sets will be cached to a computing node according to the requirements of training tasks; however, due to the limited storage resources of nodes, there will be the following problems:

problem 1: when scheduling resources, in response to that more tasks using a large data set are scheduled to the same node, the storage resources of the node will be insufficient, and there may be a problem that the storage resources of the node are less, but the central processing unit (CPU) and memory are more idle;

problem 2: all the computing nodes of the cluster may simultaneously cache a large number of data sets which are no longer used, resulting in insufficient storage resources of the nodes, and when scheduling resources, it may be found that there is no suitable node for caching data sets.

SUMMARY

In view of this, it is an object of embodiments of the present disclosure to provide a data set and node cache-based scheduling strategy, which may achieve the effect of load balancing of storage resources of cluster nodes on the premise of using local data set cache to satisfy training tasks.

In view of the above, in an aspect, the present disclosure provides a data set and node cache-based scheduling method, and the method includes:

obtaining storage resource information of each host node;

obtaining operation information of a training task in response to receiving the training task, and screening host nodes that satisfy the space required by the training task according to the operation information and the storage resource information;

scoring each host node according to the storage resource information in response to no host node satisfying the space required by the training task;

selecting from among all the host nodes a host node to be executed that is used to execute the training task according to scoring results; and obtaining and deleting an obsolete data set cache in the host node to be executed, and executing the training task in the host node to be executed.

In some embodiments of the data set and node cache-based scheduling method of the present disclosure, the method further includes:

determining whether each host node includes a data set cache required for a training task;

selecting a host node that executes a training task from the host nodes including the data set cache in response to determining that there is the host node including the data set cache.

In some embodiments of the data set and node cache-based scheduling method of the present disclosure, the obtaining operation information of a training task in response to receiving the training task, and the screening host nodes that satisfy a space required by the training task according to the operation information and the storage resource information further includes:

selecting a host node that executes the training task from a plurality of pending host nodes based on the scheduling strategy in response to screening out the plurality of pending host nodes that satisfy the space required for the training task from the host nodes.

In some embodiments of the data set and node cache-based scheduling method of the present disclosure, the obtaining storage resource information of each host node further includes:

deploying a Kubernetes (K8s, a container cluster management system) cluster within a cluster, and obtaining the storage resource information of a host node based on the Kubernetes cluster.

In some embodiments of the data set and node cache-based scheduling method of the present disclosure, the method further includes:

monitoring whether storage resource information in a host node changes;

reporting changed storage resource information in real time in response to monitoring that the storage resource information in the host node changes.

In some embodiments of the data set and node cache-based scheduling method of the present disclosure, the scoring each host node according to storage resource information in response to no host node satisfying the space required by the training task further includes:

obtaining a usage frequency of all data set caches in each host node, obtaining the obsolete data set cache in all data set caches according to the usage frequency, and scoring the host node according to the obsolete data set cache.

In some embodiments of the data set and node cache-based scheduling method of the present disclosure, the scoring each host node according to storage resource information in response to no host node satisfying the space required by the training task further includes:

determining a size of each data set cache in each host node, taking the data set cache with the size less than a preset size threshold value as the obsolete data set cache, and scoring the host node according to the obsolete data set cache.

In another aspect, the embodiments of the present disclosure also provides a data set and node cache-based scheduling device, including:

a storage resource information obtaining module configured to obtain storage resource information of each host node;

a host node screening module configured to obtain operation information of a training task in response to receiving the training task, and screen host nodes that satisfy a space required by the training task according to the operation information and the storage resource information;

a host node scoring module configured to score each host node according to the storage resource information in response to no host nodes satisfying the space required by the training task;

a host node selection module configured to select from among all the host nodes a host node to be executed that is used to execute the training task according to scoring results; and a training task execution module configured to obtain and delete an obsolete data set cache in the host node to be executed, and execute the training task in the host node to be executed.

In some embodiments of the data set and node cache-based scheduling device of the present disclosure, and the device further includes:

a cache determination module configured to determine whether each host node includes a data set cache required for a training task, and select a host node that executes a training task from the host nodes including the data set cache in response to determining that there is the host node including the data set cache.

In some embodiments of the data set and node cache-based scheduling device of the present disclosure, the host node screening module is further configured to:

select a host node that executes the training task from a plurality of pending host nodes based on the scheduling strategy in response to screening out the plurality of pending host nodes that satisfy the space required for the training task from the host nodes.

The present disclosure has at least the following advantageous technical effects: the present disclosure is a scheduling strategy for selecting a node based on the sizes of a node storage and a data set required by training task in a cluster environment. According to the present disclosure, an AI training task may be operated on a host node with a required data set or a host node with sufficient node storage space, and at the same time, when the remaining space of all nodes in the cluster is insufficient, a node data set cache deletion strategy is defined, and the training task may be operated on a host node with temporarily insufficient storage space. Based on this node selection strategy, it may effectively reduce the time to download data sets and the time to wait for available nodes, thereby improving the competitiveness of the AI management platform.

BRIEF DESCRIPTION OF THE DRAWINGS

In order to explain the embodiments of the present disclosure or the technical solutions in the prior art more clearly, a brief description will be given below with reference to the accompanying drawings which are used in the description of the embodiments or the prior art, and it is obvious that the drawings in the description below are merely some embodiments of the present disclosure, and it would have been obvious for a person skilled in the art to obtain other drawings according to these drawings without involving any inventive effort.

DETAILED DESCRIPTION

In order that the objects, aspects, and advantages of the present disclosure will become more fully apparent, embodiments of the present disclosure will be described hereinafter with reference to the accompanying drawings.

It should be noted that all the expressions using "first" and "second" in the embodiments of the present disclosure are intended to distinguish two entities with the same name but different from the same name or different parameters. "First" and "second" are merely for the convenience of expressions and should not be construed as limiting the embodiments of the present disclosure, and the subsequent embodiments will not be described one by one.

Figure 1:
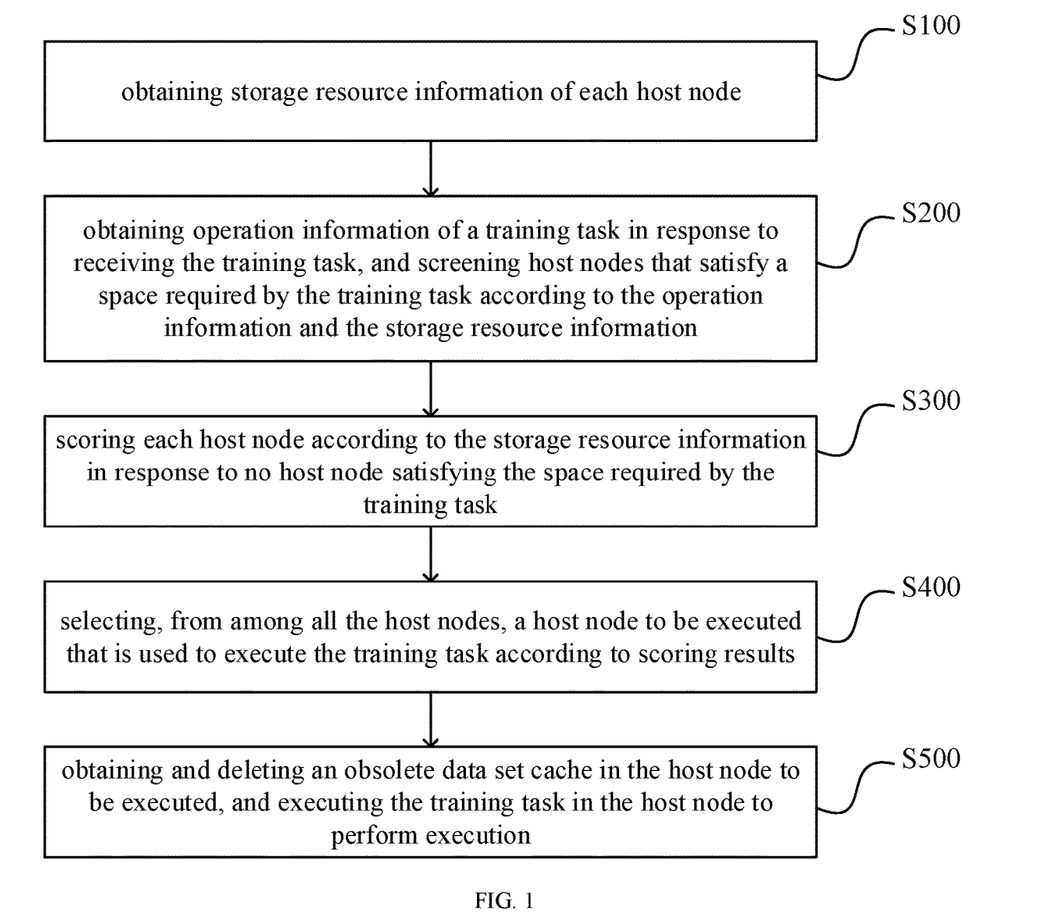
FIG. 1 shows a schematic block diagram of an embodiment of a data set and node cache-based scheduling method according to the present disclosure.

Based on the above object, in a first aspect of an embodiment of the present disclosure, an embodiment of a data set and node cache-based scheduling method is proposed. FIG. 1 shows a schematic block diagram of an embodiment of a data set and node cache-based scheduling method according to the present disclosure. In the embodiment shown in FIG. 1, the method includes at least the following steps:

S100, obtaining storage resource information of each host node;

S200, obtaining operation information of a training task in response to receiving the training task, and screening host nodes that satisfy a space required by the training task according to the operation information and the storage resource information;

S300, scoring each host node according to the storage resource information in response to no host node satisfying the space required by the training task;

S400, selecting, from among all the host nodes, a host node to be executed that is used to execute the training task according to scoring results; and S500, obtaining and deleting an obsolete data set cache in the host node to be executed, and executing the training task in the host node to be executed.

Figure 2:
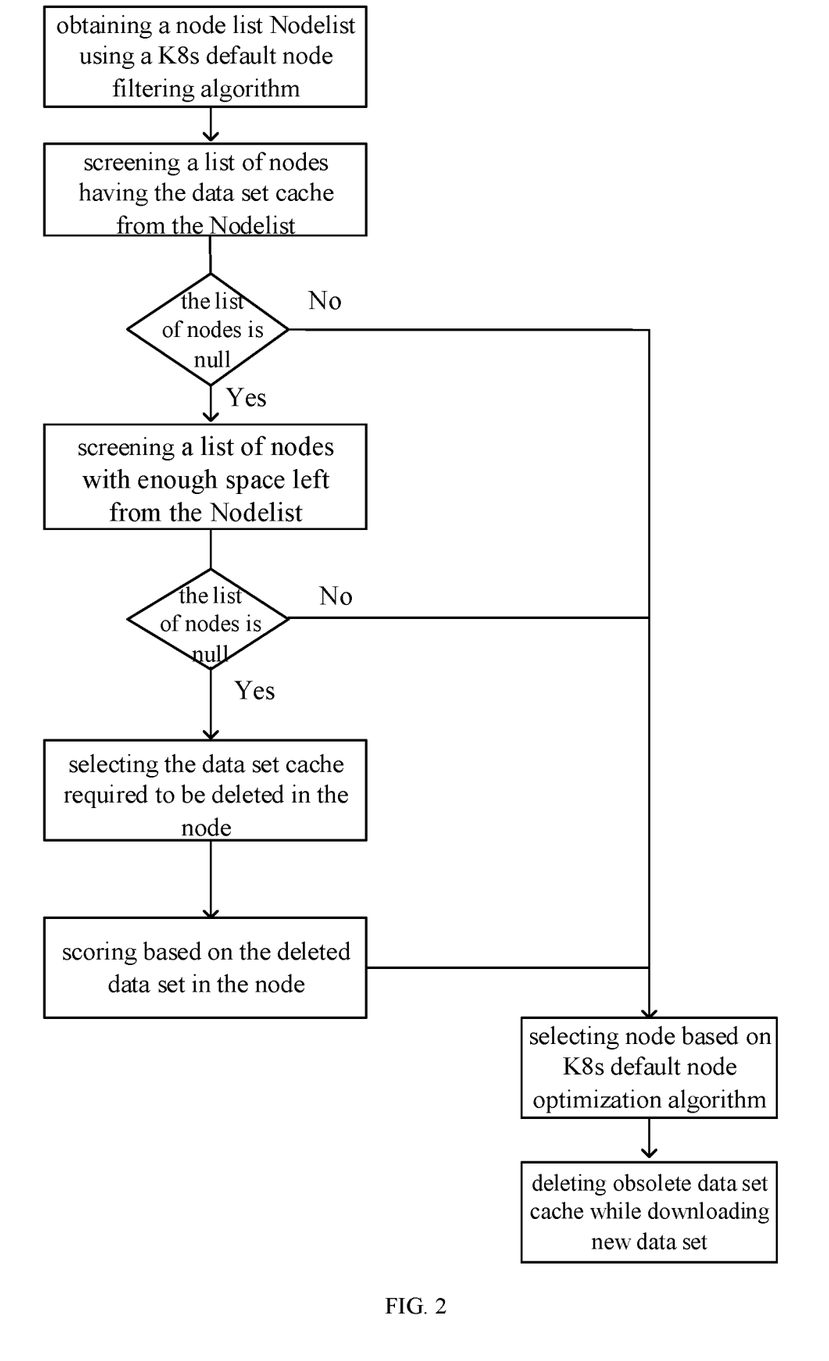
FIG. 2 shows a flow chart of an embodiment of a data set and node cache-based scheduling method according to the present disclosure.

In some embodiments of the present disclosure, FIG. 2 shows a flow chart of an embodiment of a data set and host node (which may be simply referred to as a node) cache-based scheduling method according to the present disclosure; as shown in FIG. 2, the present disclosure relates to a scheduler extension mechanism based on Kubernetes, which uses a self-developed node agent to report the state of all the data sets of a node to a scheduler, and at the same time, the scheduler queries the operation condition of a training task of an AI resource management platform; according to the remaining storage of the node, the size of the data set cache and the number of times that the data set cache is used, data set cache cleaning strategy and other factors, nodes of the cluster are scored, and the score is combined with other scheduling strategies of Kubernetes to select the optimal node for operating the training tasks.

In some embodiments of the present disclosure, according to step S100, the storage resource information of the node is collected, including a storage space $node_iDiskTotalSize$, a storage free space $node_iDiskFreeSize$, and an information list of the data set node cache (a unique identifier of a data set $dataSet_jId$, a size of the data set $dataSet_jSize$, and a number of times that the data set is used in the last one month $dataSet_jUseNumber$). According to step S200, the user submits a training task on the resource management platform, operation information of the training task includes the used data set information including a name of the data set, a unique identifier of the data set $dataSet_{task}Id$ used by the task, a size of the data set $dataSet_{task}Size$ used by the task, and other basic resource information (CPU, memory, graphics processing unit (GPU), etc.) for operating the training task; and after receiving the resource request of the training task, the scheduler firstly uses a kubernetes default algorithm to screen out nodes with sufficient CPU, memory and GPU cards. According to step S300, when the space $node_iDiskFreeSize$ of all the nodes in the cluster does not satisfy the space $dataSet_jSize$ required by the data set, with regard to the node $node_i$, when the size of the data set node cache which is no longer used by the node is greater than or equal to the size of the data set cache used by the training task, i.e., $$\sum_{j=1}^{N} dataSet_jSize \geq dataSet_{task}Size,$$

the node is taken as an alternate node; for the node $node_i$, the data set node caches needing to be deleted is selected, and a model for the data set node caches is built, and each host node is scored according to the model. According to step S400, selecting, from among all the host nodes, a host node to be executed that is used to execute the training task according to the scoring results. According to step S500, when the resource scheduling module selects an appropriate node, a list of the data set cache needing to be deleted is notified to an agent, and the agent deletes the data set cache. Since a deletion operation is to delete a node file, and downloading a data set is to download from a remote end using a Hyper Text Transfer Protocol (http) service, the speed of deleting the data set cache must be much greater than the speed of downloading the data set cache. At this point, the download of the data set may begin immediately after the training task is scheduled to the node.

In some embodiments of the data set and node cache-based scheduling method according to the present disclosure, the method further includes:
determining whether each host node includes a data set cache required for the training task;
selecting a host node that executes the training task from the host nodes including the data set cache in response to determining that there is the host node including the data set cache.

In some embodiments of the present disclosure, for the host node in the cluster, when the host node already has the data set required for the training task (i.e., the host node has the data set cache), the host node is used to operate the training task firstly, thereby avoiding downloading the data set again. When all the nodes in the cluster do not have the node cache of the data set, the node with the largest node residual space $node_iDiskFreeSize$ is selected to download the data set, and the training task is operated.

According to some embodiments of the data set and node cache-based scheduling method of the present disclosure, obtaining operation information of a training task in response to receiving the training task, and screening host nodes that satisfy a space required by the training task according to the operation information and the storage resource information further includes:
selecting a host node that executes the training task from a plurality of pending host nodes based on the scheduling strategy in response to screening out the plurality of pending host nodes that satisfy the space required for the training task from the host nodes.

In some embodiments of the present disclosure, after receiving the resource request of the training task, the scheduler firstly uses a kubernetes default algorithm to screen out nodes with sufficient CPU, memory, and GPU cards. Based on the scheduling strategy, the node with the largest residual space $dataSet_jSize$ is selected to download the data set, and the training tasks are operated.

According to some embodiments of the data set and node cache-based scheduling method of the present disclosure, the obtaining storage resource information of each host node further includes:
deploying a Kubernetes cluster within the cluster, and obtaining the storage resource information of the host node based on the Kubernetes cluster.

In some embodiments of the present disclosure, a Kubernetes cluster is deployed within the cluster, and a self-developed agent is deployed at each host node for collecting the storage resource information of the node, including a storage space $node_iDiskTotalSize$, a storage free space $node_iDiskFreeSize$, and an information list of the data set node cache (the unique identifier of a data set $dataSet_jId$, the size of the data set $dataSet_jSize$, and the number of times that the data set is used in the last one month $dataSet_jUseNumber$).

In some embodiments of the data set and node cache-based scheduling method according to the present disclosure, the method further includes:
monitoring whether the storage resource information in the host node changes;
reporting the changed storage resource information in real time in response to monitoring that the storage resource information in the host node changes.

In some embodiments of the present disclosure, when the storage resource information changes, the storage resource information needs to be reported to a resource scheduling module in real time, and the resource scheduling module performs node selection and data set node cache deletion strategy based on these.

According to some embodiments of the data set and node cache-based scheduling method of the present disclosure, the scoring each host node according to storage resource information in response to no host node satisfying a space required by a training task further includes:
obtaining a usage frequency of all data set caches in each host node, obtaining the obsolete data set cache in all data set caches according to the usage frequency, and scoring the host node according to the obsolete data set cache.

In some embodiments of the present disclosure, when the space $node_iDiskFreeSize$ of all the nodes in the cluster does not satisfy the space $dataSet_jSize$ required by the data set, with regard to the node $node_i$, when the size of the data set node cache which is no longer used by the node is greater than or equal to the size of the data set cache used by the training task, i.e., $$\sum_{j=1}^{N} dataSet_j \text{Size} \geq dataSet_{task}\text{Size},$$

the node is taken as an alternate node; for the node node$_i$, the data set node caches needing to be deleted is selected, and a model for the node data set caches is built.

When the data set cache dataset$_j$ of the node is used more times in the last one month, it means that the data set is more likely to be used by other training tasks in a future period of time; in order to avoid downloading the data set again when a new training task needs to use the data set, in this scheduling rule, we do not choose to delete the data set cache as much as possible, and we define the weight value of selecting the data set to be deleted as follows:

$$\left(1 - \frac{dataSet_j \text{UseNumber}}{\sum_{k=1}^{k=N} dataSet_k \text{UseNumber}}\right) \times 10$$

According to some embodiments of the data set and node cache-based scheduling method of the present disclosure, the scoring each host node according to the storage resource information in response to no host node satisfying a space required by a training task further includes:

determining the size of each data set cache in each host node, taking the data set cache with the size less than a preset size threshold value as the obsolete data set cache, and scoring the host node according to the obsolete data set cache.

In some embodiments of the present disclosure, when the size of the data set node cache is larger, in order to reduce the time for deleting the data set node cache, we do not select a large data set cache as much as possible to be deleted, i.e., the possibility of deleting the large data set cache is low, and we define the weight value for selecting the data set to be deleted as follows:

$$\left(1 - \frac{dataSet_j \text{Size}}{\sum_{k=1}^{k=N} dataSet_k \text{Size}}\right) \times 10$$

Figure 3:
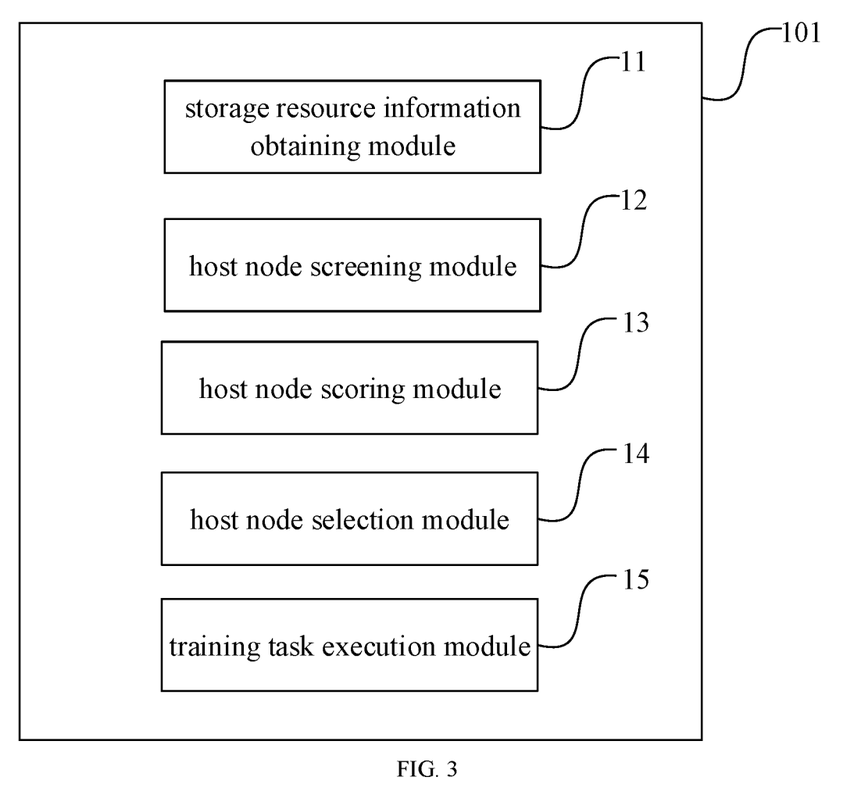
FIG. 3 shows a schematic block diagram of an embodiment of a data set and node cache-based scheduling device according to the present disclosure.

In some embodiments of the present disclosure, for a node data set, we compute and sort according to the following formula:

$$dataSet_j \text{Score} = \left(1 - \frac{dataSet_j \text{Size}}{\sum_{k=1}^{k=N} dataSet_k \text{Size}}\right) \times 10 + \left(1 - \frac{dataSet_j \text{Size}}{\sum_{k=1}^{k=N} dataSet_k \text{Size}}\right) \times 10$$

the first M data sets with the minimum number is selected, where M satisfies the following condition:

$$\sum_{j=1}^{M} dataSet_j \text{Size} \geq dataSet_{task}\text{Size}, M \in (1 \ldots N)$$

a node scoring standard taking the data set cache to be deleted in the node as a factor is established, and a node with a larger score is selected firstly, as below:

$$data_i \text{Score} = \frac{\sum_{j=1}^{M} dataSet_j \text{Score}}{M}$$

according to a first aspect of an embodiment of the present disclosure, an embodiment of a data set and node cache-based scheduling device is proposed. FIG. 3 shows a schematic block diagram of an embodiment of a data set and node cache-based scheduling device according to the present disclosure, as shown in FIG. 3, the device 101 includes:

a storage resource information obtaining module 11 configured to obtain storage resource information of each host node;

a host node screening module 12 configured to obtain operation information of the training task in response to receiving the training task, and screen host nodes that satisfy the space required by the training task according to the operation information and the storage resource information;

a host node scoring module 13 configured to score each host node according to the storage resource information in response to no host node satisfying the space required by the training task;

a host node selection module 14 configured to select, from among all the host nodes, a host node to be executed that is used to execute the training task according to the scoring results; and a training task execution module 15 configured to obtain and delete an obsolete data set cache in the host node to be executed, and execute the training task in the host node to be executed.

According to some embodiments of the data set and node cache-based scheduling device of the present disclosure, the device 101 further includes:

a cache determination module (not shown) configured to determine whether each host node includes a data set cache required for the training task, and select a host node that executes the training task from the host nodes including the data set cache in response to determining that there is the host node including the data set cache.

According to some embodiments of the data set and node cache-based scheduling device of the present disclosure, the host node screening module 12 is further configured to:

select a host node that executes the training task from a plurality of pending host nodes based on the scheduling strategy in response to screening out the plurality of pending host nodes in the host nodes that satisfy the space required for the training task.

As such, a person skilled in the art will appreciate that all embodiments, features, and advantages set forth above with respect to the data set and node cache-based scheduling method according to the present disclosure apply equally to the device according to the present disclosure. For the sake of brevity of the present disclosure, this description is not repeated here.

It should be noted that a person skilled in the art would understand that the implementation of all or part of the flows in the methods of the above-mentioned embodiments may be performed by a computer program instructing relevant hardware, and a program of a data set and node cache-based scheduling method may be stored in a computer-readable storage medium, and when executed, the program may include the flows of the embodiments of the methods as described above. The storage medium of the program may be a magnetic disk, an optical disk, a ROM, read-Only Memory or RAM, random Access Memory, etc. Embodiments of the computer program described above may achieve the same or similar effects as any of the method embodiments described above corresponding thereto.

A person skilled in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as software or hardware depends upon the application and design constraints imposed on the overall system. A person skilled in the art may implement the described functionality in varying ways for each application, but such implementation decisions should not be interpreted as causing a departure from the scope of the disclosed embodiments.

It will be understood that, as used herein, the singular forms "a", "an", and "the" are intended to include the plural forms as well, unless the context clearly supports the exception. It should also be understood that "and/or" as used herein is meant to include all possible combinations of one or more of the associated listed items.

The above-described embodiments of the present disclosure have been disclosed for the purpose of illustration only, and are not intended to represent the advantages and disadvantages of the embodiments.

A person skilled in the art will appreciate that the above discussion of any embodiments is intended to be exemplary only, and is not intended to suggest that the scope of the disclosed embodiments (including the claims) is limited to these examples; combinations of features in the above embodiments or in different embodiments are also possible within the framework of embodiments of the present disclosure, and many other variations of different aspects of the embodiments of the present disclosure as described above are not provided in detail for the sake of clarity. Accordingly, it is intended that the present disclosure cover the modifications and variations of this invention provided they come within the scope of the appended claims and their equivalents.

The invention claimed is:

1. A data set and node cache-based scheduling method, comprising:
   obtaining storage resource information of each host node;
   obtaining operation information of a training task in response to receiving the training task, and screening host nodes that satisfy a space required by the training task according to the operation information and the storage resource information;
   scoring each host node according to the storage resource information in response to no host node satisfying the space required by the training task;
   selecting, from among all the host nodes, a host node to be executed that is used to execute the training task according to scoring results; and
   obtaining and deleting an obsolete data set cache in the host node to be executed, and executing the training task in the host node to be executed.

2. The data set and node cache-based scheduling method according to claim 1, further comprising:
   determining whether each host node includes a data set cache required for the training task; and
   selecting a host node that executes the training task from the host nodes including the data set cache in response to determining that there is the host node including the data set cache.

3. The data set and node cache-based scheduling method according to claim 2, further comprising:
   in response to determining that there is no host node including the data set cache, selecting a host node with a largest node residual space download a data set, and operating the training task.

4. The data set and node cache-based scheduling method according to claim 1, wherein the obtaining operation information of a training task in response to receiving the training task, and screening host nodes that satisfy a space required by the training task according to the operation information and the storage resource information further comprises:
   selecting a host node that executes the training task from a plurality of pending host nodes based on the scheduling strategy in response to screening out the plurality of pending host nodes that satisfy the space required for the training task from the host nodes.

5. The data set and node cache-based scheduling method according to claim 1, wherein the obtaining storage resource information of each host node further comprises:
   deploying a Kubernetes cluster within a cluster, and obtaining the storage resource information of the host node based on the Kubernetes cluster.

6. The data set and node cache-based scheduling method according to claim 1, comprising:
   monitoring whether the storage resource information in the host node changes;
   reporting changed storage resource information in real time in response to monitoring that the storage resource information in the host node changes.

7. The data set and node cache-based scheduling method according to claim 1, wherein the scoring each host node according to the storage resource information in response to no host node satisfying the space required by the training task further comprises:
   obtaining a usage frequency of all data set caches in each host node, obtaining the obsolete data set cache in all data set caches according to the usage frequency, and scoring the host node according to the obsolete data set cache.

8. The data set and node cache-based scheduling method according to claim 1, wherein the scoring each host node according to the storage resource information in response to no host node satisfying the space required by the training task further comprises:
   determining a size of each data set cache in each host node, taking the data set cache with the size less than a preset size threshold value as the obsolete data set cache, and scoring the host node according to the obsolete data set cache.

9. The data set and node cache-based scheduling method according to claim 1, wherein the storage resource information comprises a storage space, a storage free space and an information list of a data set node cache; and
   the information list of the data set node cache comprises a unique identifier of a data set, a size of the data set and a number of times that the data set is used in the last one month.

10. The data set and node cache-based scheduling method according to claim 1, wherein the operation information of the training task comprises used data set information and basic resource information for operating the training task;

the used data set information comprises a name of a data set, a unique identifier of the data set used by the training task and a size of the data set used by the training task; and the basic resource information comprises a central processing unit, a memory and a graphics processing unit.

11. The data set and node cache-based scheduling method according to claim 1, wherein the scoring each host node according to the storage resource information in response to no host node satisfying the space required by the training task further comprises:

regarding a host node as an alternate node when a size of a data set node cache which is no longer used by the host node is greater than or equal to a size of a data set cache used by the training task;

selecting data set node caches to be deleted in the alternate node, and building a model for the data set node caches; and scoring each host node according to the model.

12. A data set and node cache-based scheduling device, comprising:

a storage resource information obtaining module configured to obtain storage resource information of each host node;

a host node screening module configured to obtain operation information of a training task in response to receiving the training task, and screen host nodes that satisfy a space required by the training task according to the operation information and the storage resource information;

a host node scoring module configured to score each host node according to the storage resource information in response to no host node satisfying the space required by the training task;

a host node selection module configured to select, from among all the host nodes, a host node to be executed that is used to execute the training task according to scoring results; and a training task execution module configured to obtain and delete an obsolete data set cache in the host node to be executed, and execute the training task in the host node to be executed.

13. The data set and node cache-based scheduling device according to claim 12, wherein the device further comprises:

a cache determination module configured to determine whether each host node includes a data set cache required for a training task, and select a host node that executes a training task from the host nodes including the data set cache in response to determining that there is the host node including the data set cache.

14. The data set and node cache-based scheduling device according to claim 13, wherein the cache determination module is further configured to:

in response to determining that there is no host node including the data set cache, select a host node with a largest node residual space download a data set, and operate the training task.

15. The data set and node cache-based scheduling device according to claim 12, wherein the host node screening module is further configured to:

select a host node that executes the training task from a plurality of pending host nodes based on the scheduling strategy in response to screening out the plurality of pending host nodes that satisfy the space required for the training task from the host nodes.

16. The data set and node cache-based scheduling device according to claim 12, wherein storage resource information obtaining module is further configured to:

deploy a Kubernetes cluster within a cluster, and obtaining the storage resource information of the host node based on the Kubernetes cluster.

17. The data set and node cache-based scheduling device according to claim 12, wherein the device further comprises:

a storage resource information monitoring module configured to monitor whether the storage resource information in the host node changes, and report changed storage resource information in real time in response to monitoring that the storage resource information in the host node changes.

18. The data set and node cache-based scheduling device according to claim 12, wherein the host node scoring module is further configured to:

obtain a usage frequency of all data set caches in each host node, obtain the obsolete data set cache in all data set caches according to the usage frequency, and score the host node according to the obsolete data set cache.

19. The data set and node cache-based scheduling device according to claim 12, wherein the host node scoring module is further configured to:

determine a size of each data set cache in each host node, take the data set cache with the size less than a preset size threshold value as the obsolete data set cache, and score the host node according to the obsolete data set cache.

20. The data set and node cache-based scheduling device according to claim 12, wherein the host node scoring module is further configured to:

regard a host node as an alternate node when a size of a data set node cache which is no longer used by the host node is greater than or equal to a size of a data set cache used by the training task;

select data set node caches to be deleted in the alternate node, and build a model for the data set node caches; and score each host node according to the model.

* * * * *